US 7,777,890 B2

(12) United States Patent
Urgell et al.

(10) Patent No.: US 7,777,890 B2
(45) Date of Patent: Aug. 17, 2010

(54) METHOD AND POWER-ASSISTED OPTIC-FIBER MEASURING DEVICE AND GYRO

(75) Inventors: Alexandre Urgell, Boulogne Billancourt (FR); Eric Willemenot, Plouzane (FR); Thierry Gaiffe, St Germain-en-Laye (FR)

(73) Assignee: Ixsea, Marly-le-Roi (FR)

( * ) Notice: Subject to any disclaimer, the term of this patent is extended or adjusted under 35 U.S.C. 154(b) by 165 days.

(21) Appl. No.: 12/297,131

(22) PCT Filed: Apr. 5, 2007

(86) PCT No.: PCT/FR2007/051074

§ 371 (c)(1),
(2), (4) Date: Oct. 14, 2008

(87) PCT Pub. No.: WO2007/116185

PCT Pub. Date: Oct. 18, 2007

(65) Prior Publication Data
US 2009/0161112 A1 Jun. 25, 2009

(30) Foreign Application Priority Data
Apr. 11, 2006 (FR) .................................. 06 51313

(51) Int. Cl.
*G01C 19/72* (2006.01)
(52) U.S. Cl. ..................................................... 356/464
(58) Field of Classification Search ................. 356/460, 356/464
See application file for complete search history.

(56) References Cited

U.S. PATENT DOCUMENTS

| 4,299,490 | A | | 11/1981 | Cahill et al. |
| 5,141,316 | A | * | 8/1992 | Lefevre et al. ............... 356/464 |
| 7,505,139 | B2 | * | 3/2009 | Bergh ......................... 356/464 |
| 2004/0233455 | A1 | | 11/2004 | Keller |
| 2004/0246487 | A1 | * | 12/2004 | Lehureau ..................... 356/464 |
| 2008/0218765 | A1 | * | 9/2008 | Bergh ......................... 356/464 |

FOREIGN PATENT DOCUMENTS

| EP | 0206970 | 12/1986 |
| FR | 2654827 | 5/1991 |

OTHER PUBLICATIONS

International search report in corresponding PCT/FR2007/051074.

* cited by examiner

*Primary Examiner*—Patrick J Connolly
(74) *Attorney, Agent, or Firm*—Young & Thompson

(57) ABSTRACT

The invention relates to a method and an optical-fiber measuring device including a light source with a light power P, a Sagnac ring interferometer in which propagate two counter-propagating waves, a detector receiving a light flux from the interferometer and converting it into an electrical signal representing the total phase difference $\delta\phi_t$ between the counter-propagating waves. It also includes an electronic element receiving the electrical signal from the detector and providing a first signal $S_1$ function of the measured parameter. The electronic element includes a demodulator contributing to provide the first signal function of the measured parameter and provide a second signal $S_2$ function of the power P of the light flux measured by the detector. The optical phase modulator generates a disturbance component $\delta\phi_{cp}$ adding to the phase difference $\delta\phi_m = \delta\phi_b + \delta\phi_{cr}$.

20 Claims, 6 Drawing Sheets

METHOD AND POWER-ASSISTED OPTIC-FIBER MEASURING DEVICE AND GYRO

The present invention relates to an optical-fibre measuring device allowing to measure the variation of the parameter generating nonreciprocal disturbances in a Sagnac ring interferometer.

The Sagnac interferometer and the physical phenomenons it implies are well known. In such an interferometer, a beam splitting plate or another beam splitting device divides an incident wave. The two counter-propagating waves thus created propagate in opposite directions along a closed optical path, recombine together and produce interferences which depend on the phase difference between the waves during their recombination.

It is known that according to the light reciprocity principle the optical path traveled by an optical wave is independent of the travelling direction of the wave on this path, supposing however that the propagation conditions are stationary in time. It results that the phase shift measured by a Sagnac interferometer is insensitive to any so-called reciprocal disturbance which affects likewise counter-propagating waves, i.e. waves that travel along the optical path in a direction or in the other. Thus, the reciprocity principle operates similarly to a common mode rejection, and cancels the effect of most of the propagation condition changes the time constant of which is great compared to the light propagation time in the interferometer.

Originally, the closed optical path of Sagnac interferometers was defined by mirrors. It is now known it can consist of a single-mode optical-fibre multi-turn coil.

It is also known that certain physical phenomenons are liable to produce disturbances, in particular nonreciprocal phase shifts, on the counter-propagating waves, generating relative phase differences between these waves which modify the interference state thereof during their recombination.

Measuring the relative phase difference allows to quantify the phenomenon that generated it.

The main physical phenomenon liable to create nonreciprocal disturbances is the Sagnac Effect produced by the rotation of the interferometer relative to an axis perpendicular to the plane of the closed optical path thereof. The Faraday Effect or collinear magneto-optic effect is also known as producing such nonreciprocal effects.

Other effects can also produce in certain conditions a non-reciprocal phase difference.

At the opposite, variations of numerous parameters representative of the environment, which are often the cause of measuring disturbances, have only reciprocal effects on the Sagnac interferometer, do not disturb the relative phase difference between the counter-propagating waves and thus do not have any influence on the studied parameter measuring. Such is the case of the slow variations of temperatures, indices, etc. . . . , which modify the optical path traveled by the waves, but modify it in a reciprocal manner.

Numerous works have been conducted to improve the sensitivity and the accuracy of measures that can be made with such a measuring apparatus. For further reading on this subject, see for example Chapter 9, titled "Fiber Optic Gyroscope" by Hervé C. LEFEVRE in "Optical Fiber Sensors" Vol. 2—ARTECH HOUSE—1989, and the article titled "Principe du gyrofibre, le gyromètre, des applications à haute dynamique" by the same author, published in "La Revue Scientifique de la Défense" (1st trimester 1990).

Different signal processing modes have been proposed. First, it has been noticed that the response provided by the Sagnac interferometer is in the form of $P=P_o(1+\cos\delta\phi)$ and thus that the sensitivity of this signal in the vicinity of the phase difference $\delta\phi=0$ is low. It has been proposed to introduce a phase difference modulation $\delta\phi_b$, square and with an amplitude of more or less $\pi/2$, for example, which shifts the operating point and produces a periodic signal the amplitude of which is a sinusoidal function of the measured parameter and which can thus be used with greater sensibility and stability. This phase difference is called the biasing phase difference $\delta\phi_b$.

This phase difference $\delta\phi_b$ is produced by a phase modulator, placed at one end of the interferometer multi-turn coil and controlled by a control signal $V_b$. This control signal $V_b$ generates on each wave a phase shift $\phi_b$ which produces a phase difference between the counter-propagating waves:

$$\delta\phi_b(t)=\phi_b(t)-\phi_b(t-\tau)$$

where t is the time and $\tau$ is the transit time of one of the waves in the coil.

It has next been demonstrated that the accuracy of the measure is improved by the use of a zero method also called closed-loop operating. According to this method, an additional so-called feedback phase difference $\delta\phi_{cr}$ is applied and serves to offset the phase difference $\delta\phi_p$ produced by the measured parameter. The sum of this two phase differences $\delta\phi_{cr}$ and $\delta\phi_p$ is kept at zero, which enables the interferometer to be operated with the maximal sensitivity. The measuring is done by use of the signal necessary to the production of the feedback phase difference $\delta\phi_{cr}$. The measuring is thus stable and linear.

This phase difference $\delta\phi_{cr}$ is produced by the phase modulator controlled by a signal $V_{cr}$ which adds to the biasing modulation $V_b$ to give the total signal $V_m$. This signal $V_{cr}$ generates on each wave a phase shift $\phi_{cr}$ which produces a phase difference $\delta\phi_{cr}$ between the counter-propagating waves:

$$\delta\phi_{cr}(t)=\phi_{cr}(t)-\phi_{cr}(t-\tau).$$

An implementation of the so-called serrodyne method consists in applying a staircase time signal the steps of which have a duration $\tau$ and a height equal to the phase difference $\delta\phi_{cr}$ wished to be applied. To avoid the signal $\phi_{cr}$ to increase up to plus or minus infinite, it is necessary to make phase jumps corresponding to multiples of $2\pi$, to which the interferometer is insensitive because the response thereof is in the form of $P=P_0(1+\cos(\delta\phi))=P_0(1+\cos(\delta\phi+k\cdot 2\pi))$, where k is any positive or negative integer. Such a serrodyne modulation has a sawtooth characteristic waveform.

Moreover, in French patent FR-A-2 654 827, a so-called "four-state" signal processing as been proposed, which provides the closed-loop operation of the interferometer. According to this technique, the biasing phase difference $\delta\phi_b$ is modulated on four successive values $\alpha_0$, $2\pi-\alpha_0$, $-\alpha_0$, $-(2\pi-\alpha_0)$. This particular modulation allows, in addition to the zero-servo control of the above described phase shift $\delta\phi_p+\delta\phi_{cr}$, to follow the variations of the ratio between the signal applied to the modulator and the resulting phase shift. Indeed, this ratio between the signal applied to the modulator and the resulting phase shift is defined by a value denoted $V_\pi=\pi\cdot V_m/\phi_m$, which varies with the environment, for example with the temperature. Thus, the "four-state" modulation allows at the same time to zero-servo control the phase shift $\delta\phi_p+\delta\phi_{cr}$ and to servo control the setting of $V_\pi$, and has several specific advantages.

FIG. 1 shows a prior art device using a feedback closed-loop and in which the measured parameter is the rotation speed of the Sagnac interferometer. This optical-fibre gyroscope comprises a Sagnac interferometer 1 which includes an optical fibre wound into a multi-turn coil 2 about an axis about which the rotation of said interferometer 1 is measured. The two electromagnetic waves which propagate in opposite directions in the interferometer 1 are emitted by a light source 3. This source is a wide-spectrum source, for example a superluminescent solid-state source. Between light source 3 and interferometer 1 is placed an optical arrangement including a first optical fibre 4 an end 5 of which is located at a point of maximal emission of the light source 3, the other end sending the light emitted by said source 3 to an optical beam coupler 6. This coupler 6 comprises a medium 7 transmitting the light and four gates 8-11, disposed by pairs at each end of this medium 7. A first gate 8 receives the light emitted by first optical fibre 4 which runs from light source 3. On the other gate 9 located on the same side of coupler 6 is positioned a second optical fibre 12 which is connected to a photodetector 13. At the other end of coupler 6, a gate 10 is connected to Sagnac interferometer 1 through a third optical fibre. Fourth gate 11 located on the same side of coupler 6 comprises a non-reflective termination 14 using, for example, an optical fibre portion. The gyroscope also comprises a phase modulator 15 placed at one end of the multi-turn fibre coil of interferometer 1. This optical phase modulator 15 receives control signals emitted by a digital-analog converter 16.

The optical signals outputting from Sagnac interferometer 1 are sent through second optical fibre 12 to photodetector 13, which converts them into electrical signals representative of said received optical signals. A closed-loop circuit connected to photodetector 13 on the one hand and to digital-analog converter 16 of the phase modulator on the other hand comprises an amplifier 17 to amplify the electrical signal produced by photodetector 13, an analog-digital converter 18 digitizing the amplified electrical signal, and a digital electronic loopback means 19. This digital electronic loopback means 19 determine the feedback phase difference $\delta\phi_{cr}$ which offsets the phase difference $\delta\phi_p$ introduced by the rotation of the Sagnac interferometer, and adds the biasing component $\delta\phi_b$.

Digital electronic loopback means 19 comprises a phase demodulator 20, followed by a PID-type regulator 21 ("PID"—Proportional, Integral and Derivative action) and an additional integrator 22 to offset the differentiation formed by the switch from $\phi_m$ to $\delta\phi_m$, during the modulation operation. Further, it comprises a biasing modulator 23 the output of which is added to the feedback in adder 24 to form the total signal which is sent to digital-analog converter 16.

Phase demodulator 20 takes into account, synchronously with the biasing modulation, the sign taken by the measured signal representing the rotation direction. Thus, in a hypothesis of "two-state" biasing modulation about, for example, two successive values $\pi/2$ and $-\pi/2$, phase demodulator 20 multiplies the received signals by the values +1 and −1 respectively.

Regulator 21 often comprises a simple integrator, and in this case, the servo control is then in the order or 1. The demodulated signals at the output of phase demodulator 20 and at the input of regulator 21 represent the zero-servo-control error signal. The output signal of regulator 21 is denoted $\delta V_{cr}$. It is a measure of $\delta\phi_{cr}=-\delta\phi_p$ and thus a value proportional to the rotation speed.

Integrator 22 executes an additional integration to offset the differentiation due to the reciprocal modulation which takes place in optical phase modulator 15.

Biasing modulator 23 generates a signal which, once differentiated by the reciprocal modulation, executes the biasing to the desired values. For example, for a "two-state" modulation to successive values $\delta\phi_{b1}=\pi/2$ and $\delta\phi_{b2}=-\pi/2$, biasing modulator 23 can generate a square-waveform periodic signal with period $2\pi$, alternating between value $V_{b1}=V_\pi/2$ during the time $\pi$ and $V_{b2}=0$ during the other half of the period.

Adder 24 adds biasing signal $V_b$ and feedback signal $V_{cr}$. The output of adder 24 is connected to digital-analog converter 16 which controls optical phase modulator 15.

Such a prior art digital closed-loop device enables excellent performances to be obtained, notably as for the resolution and the noise associated to the rotation speed measuring, this noise being also called angular random walk (ARW). ARW results from the signal-to-noise ratio of the optical detection of signals outputted from Sagnac interferometer 1. Thus, ARW vary due to the variations of the passive component optical losses and of the active component efficiency.

To stabilize the optical power of said device, the solution frequently used then consists in a servo control of the power of light source 3 through a simple measuring carried out by a photodetector 25 connected after a tap coupler 26. This tap coupler 26 is placed between first optical fibre 4 running from light source 3 and first gate 8 of coupler 6. From the measure taken by photodetector 25, a power-loopback electronic block 27 of the source controls light source 3. Thus, if for example the power measured by photodetector 27 is lower than a desired value, block 27 increases the control of the source until the measure taken by photodetector 27 corresponds to this desired value (FIG. 2).

This solution is limited in that it does not allow to offset the loss evolution of the optical components placed after light source 3, said evolution resulting for example from an obscuration of said components due to radiations for gyroscopes used in space applications or to a dependence in temperature of the optical attenuation. A simple shift of the power measuring point at the detection level is delicate because the light has travel through optical phase modulator 15 and the coil and consequently depends on the phase shift state of interferometer 1, thus on the rotation, the feedback and the biasing. The measured level will notably depend on power peaks which occur during transient states between the modulation states and phase jumps of $2\pi$.

Thus, the object of the invention is to propose an optical-fibre measuring device the design and the operating procedure of which are simple, using the same detection chain than that which serves to measure the rotation to extract therefrom a piece of information about the power available at interferometer output, that is the detection power $P_0$ of the interferometer when the latter is at a zero phase shift state.

Another object is to measure the operating loop gain and so to provide a self-test of the good operation of main loop through introduction inside the closed-loop of a disturbance within the main loop bandwidth.

This measuring device advantageously allows to offset the attenuation variables of the optical-fibre multi-turn coil exposed to radiations.

To that end, the invention relates to an optical-fibre measuring device in which the variation of a measured parameter generates a phase difference between two waves, including:
  a wide-spectrum light source with a light power P,
  a Sagnac ring interferometer, preferably single-mode, in which propagate two counter-propagating waves, the wave propagation time between the separation and recombination thereof being $\tau$,
  a detector receiving a light flux from the interferometer and converting it into an electrical signal representing the total phase difference $\delta\phi_t$ between the counter-propagating waves, an optical phase modulator generating a phase difference $\delta\phi_m = \delta\phi_b + \delta\phi_{cr}$, including a biasing component $\delta\phi_b$ and a feedback component $\delta\phi_{cr}$, electronic means receiving the electrical signal from the detector and providing a first signal $S_1$ function of the measured parameter, the first signal function of the measured parameter producing an optical phase modulator first control signal $V_{cr}$, determined so that the phase difference $\delta\phi_{cr}$ produced thereby between the counter-propagating waves offsets the phase difference $\delta\phi_p$ introduced by the measured parameter, the electronic means including a demodulator contributing to provide the first signal function of the measured parameter, the electronic means providing a second signal $S_2$ function of the light power P of the light source.

According to the invention, the optical phase modulator generates a disturbance component $\delta\phi_{cp}$ adding to the phase difference $\delta\phi_m = \delta\phi_b + \delta\phi_{cr}$.

In different particular embodiments of the optical-fibre measuring device, each having respective particular advantages and being liable to numerous possible technical combinations:

the electronic means include a closed-loop feedback circuit comprising electronic means for servo-controlling the light power P of the light source, the device comprises an amplifier to amplify the electrical signal produced by the detector and an analog-digital converter digitizing the amplified electrical signal, this amplifier and this converter being placed between the detector and the electronic means, the electronic means comprise a biasing modulator producing an optical phase modulator second control signal $V_b$ to generate the biasing component $\delta\phi_b$, the electronic means comprise an adder comprising two inputs and one output, the first input of the adder receiving the optical phase modulator first control signal $V_{cr}$ and the other input thereof receiving the optical phase modulator second control signal $V_b$, and the device comprising a digital-analog converter receiving the output signal of the adder and controlling the optical phase modulator, the electronic means comprise:
  a regulator placed after the demodulator, the regulator being a first integrator,
  a second integrator placed after the first integrator,
  a disturbance source introducing a frequency disturbance $f_{cp}$ generating an optical phase modulator third control signal $V_{cp}$, the third control signal $V_{cp}$ producing a phase difference $\delta\phi_{cp}$ between the counter-propagating waves and adding to the first control signal $V_{cr}$,
  this disturbance being injected through a disturbance injection circuit immediately before or after the regulator, the disturbance has a zero-mean value,
the disturbance is aperiodic,
the frequency $f_{cp}$ of the disturbance is greater than the frequency of the measured parameter signal,
the disturbance signal includes pseudo-random ramps,
the biasing component $\delta\phi_b$ is generated by an optical phase modulator second control signal $V_b$, determined so that the phase difference $\delta\phi_b$ produced thereby between the counter-propagating waves takes at least six states ($\delta\phi_1$, $\delta\phi_2$, ... ) defined by $\alpha_0$ and $\epsilon_0$, with $0 \leq \epsilon_0 \leq \alpha_0 < \pi$ and such that:

$\delta\phi_1 = \alpha_0 - \epsilon_0 \quad \delta\phi_4 = -(\alpha_0 - \epsilon_0)$ $\delta\phi_2 = \alpha_0 \quad \delta\phi_5 = -\alpha_0$ $\delta\phi_3 = 2\pi - \alpha_0 \quad \delta\phi_6 = -(2\pi - \alpha_0)$ and the electronic means produce a second signal $S_2$ function of the power P of the light flux measured by the detector using the six values $x_1, x_2, x_3, x_4, x_5$ et $x_6$ provided in response to a period of the control signal according to the formula $(x_1 + x_4) - (x_2 + x_5)$.

The invention also relates to a gyrometer according to the above described measuring device, the measured parameter being the rotation speed of the interferometer.

The invention also relates to a method for measuring a parameter whose variation generates a phase difference between two waves, in which:

two counter-propagating waves emitted by a wide-spectrum light source with a light power P are propagated in a preferably single-mode Sagnac ring interferometer, the wave propagation time between the separation and recombination thereof being $\tau$, the light flux outputted from the interferometer is detected and converted into an electrical signal representing the total phase difference 64 between the counter-propagating waves, a phase difference $\delta\phi_m = \delta\phi_b + \delta\phi_{cr}$ between the counter-propagating waves is generated, the phase difference $\delta\phi_m$ including a biasing component $\delta\phi_b$ and a feedback component $\delta\phi_{cr}$)

an electrical signal outputted from the detector is sent to electronic means and the electronic means determine a first signal $S_1$ function of the measured parameter, this first signal function of the measured parameter producing an optical phase modulator first control signal $V_{cr}$, determined so that the phase difference $\delta\phi_{cr}$ produced thereby between the counter-propagating waves offsets the phase difference $\delta\phi_p$ introduced by the measured parameter, the electronic means determine a second signal $S_2$ function of the light power P of the light source from the electrical signal outputted from the detector.

According to the invention, the optical phase modulator generates a disturbance component $\delta\phi_{cp}$ adding to the phase difference $\delta\phi_m = \delta\phi_b + \delta\phi_{cr}$.

The invention will be described in greater detail with reference to appended drawings, in which.

Figure 1:
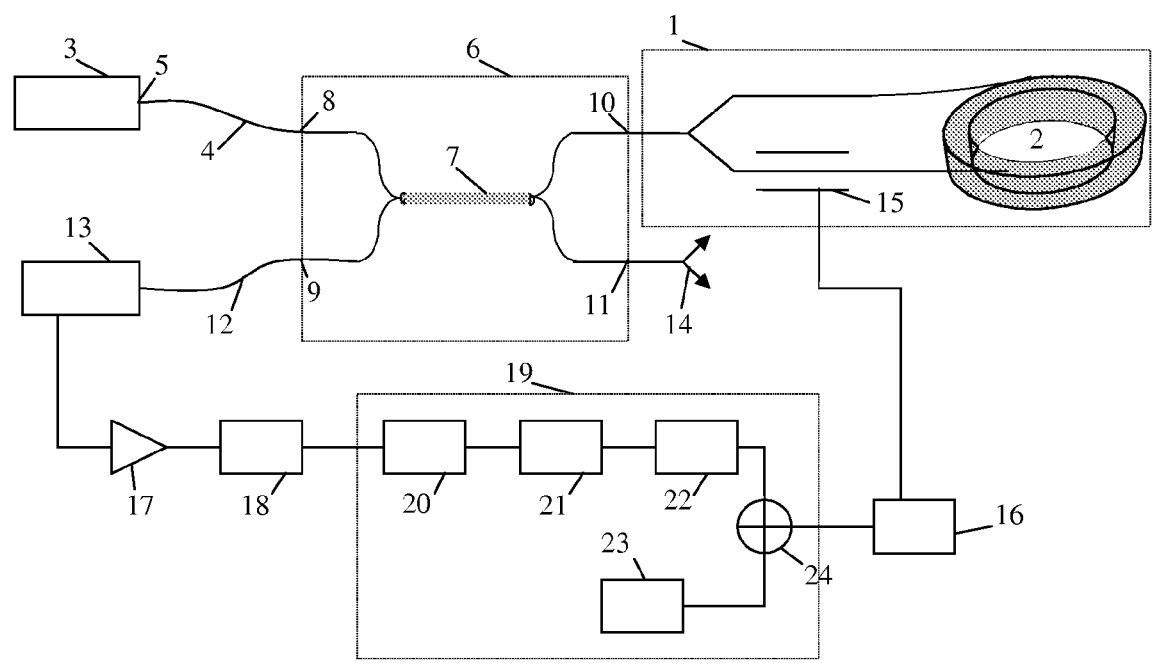
FIG. 1 is a schematic representation of an optical-fibre gyroscope according to a first embodiment of the prior art.
Figure 2:
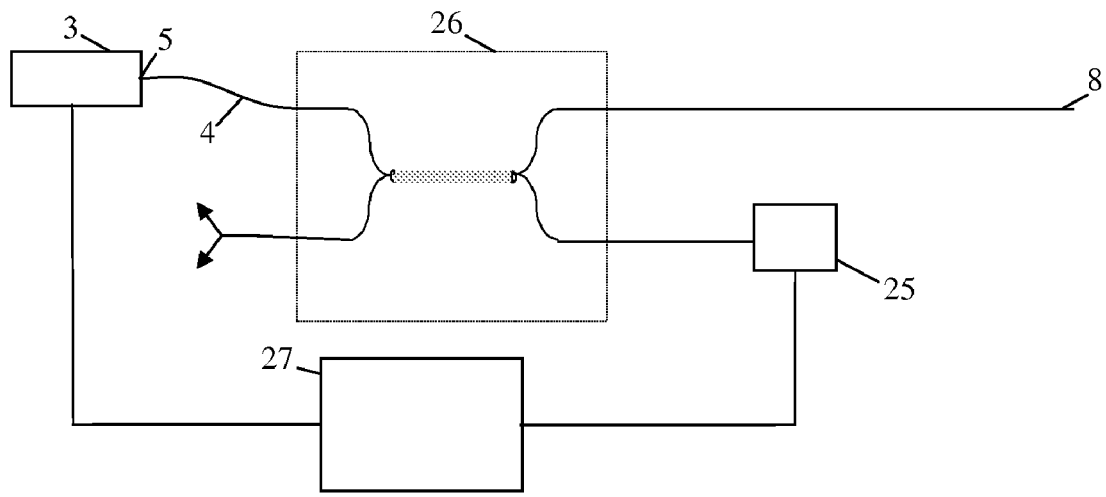
FIG. 2 is a schematic representation of an optical-fibre gyroscope according to a second embodiment of the prior art.
Figure 3:
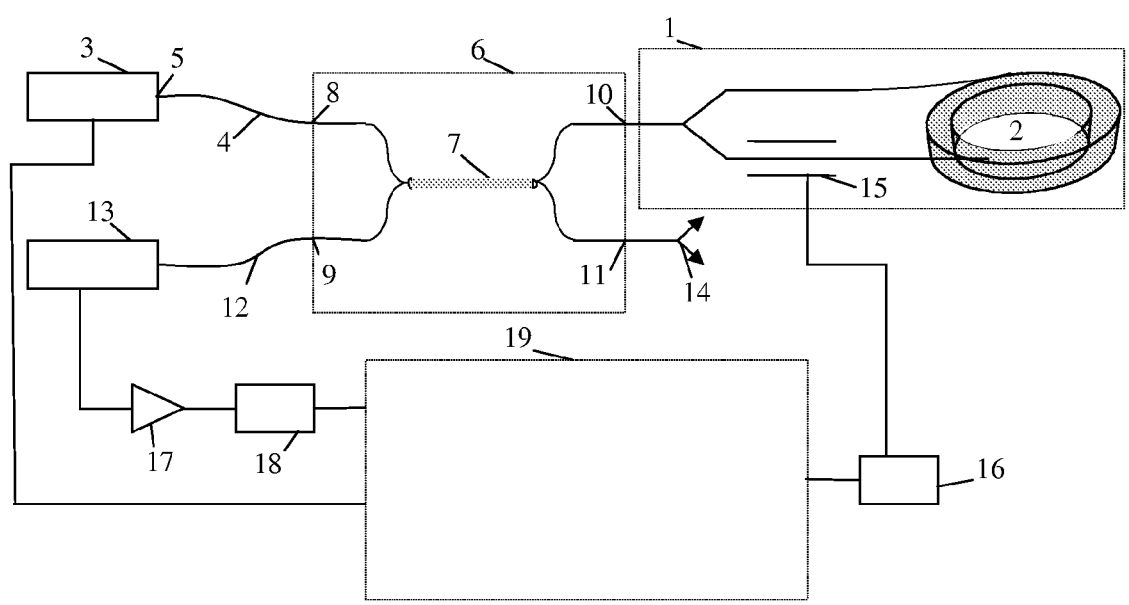
FIG. 3 is a schematic representation of an optical-fibre measuring device according to an embodiment of the invention.

FIG. 3 shows an optical-fibre measuring device according to the invention in which the variation of a measured parameter generates a phase difference between two waves. This device includes a wide-spectrum light source 3 with a light power P the mean wavelength of which is km. It also comprises a Sagnac ring interferometer 1, preferably single-mode, in which two counter-propagating waves propagate. The wave propagating time between the separation and recombination thereof is τ. Sagnac interferometer 1 includes an optical fibre wound into a multi-turn coil 2. Between light source 3 and interferometer 1 is placed an optical arrangement in which the elements denoted by the same reference than those of FIG. 1 represent the same objects. The measuring device also comprises a detector 13 which receives a light flux from the interferometer and converts it into an electrical signal representing the total phase difference $\delta\phi_t$ between the counter-propagating waves. The electrical signal emitted by detector 13 is sent to electronic means 19 which provide a first signal $S_1$ function of the measured parameter. These electronic means 19 comprise a phase demodulator 20 contributing to provide the first signal $S_1$.

The first signal $S_1$ generates a first control signal $V_{cr}$ sent through a digital-analog converter 16 to an optical phase modulator 15 placed at one end of the fibre multi-turn coil of interferometer 1. This first control signal $V_{cr}$ is determined so that the phase difference $\delta\phi_{cr}$ produced thereby between the counter-propagating waves offsets the phase difference $\delta\phi_p$ introduced by the measured parameter. Phase generator 15 generates a phase difference $\delta\phi_m = \delta\phi_b + \delta\phi_{cr}$, comprising the feedback component $\delta\phi_{cr}$ and a biasing component $\delta\phi_b$.

According to the invention, electronic means 19 further provide a second signal $S_2$ function of the light power P of the light source.

Preferably, these electronic means 19 are placed on a closed-loop circuit connected to photodetector 13 on the one hand and to digital-analog converter 16 on the other hand. This closed circuit also comprises an amplifier 17 to amplify the electrical signal produced by detector 13 and an analog-digital converter 18 digitizing the amplified electrical signal, which are placed between detector 13 and electronic means 19.

In an embodiment of the invention, it is sought to shift the feedback by a constant A homogeneous to a phase shift to obtain this second signal $S_2$. Optical phase modulator 15 thus receives a third control signal $V_{cp}$ that adds to the first and second control signals $V_{cr}$ and $V_b$ to generate a disturbance component $\delta\phi_{cp}$ adding to the phase difference $\delta\phi_m = \delta\phi_b + \delta\phi_{cr}$. A disturbance source introducing a frequency disturbance $f_{cp}$ generates this optical phase modulator third control signal $V_{cp}$.

Injection of this disturbance through an injection circuit is advantageously made immediately before the regulator (FIG. 3).

Disturbance which is so injected corresponds to non-zero angular accelerations. The zero-servo control sought to be made on the difference between the input signal e(t) and the output signal s(t) of Sagnac loop (FIG. 4), i.e. on the phase error $(\delta\phi_p + \delta\phi_{cr})$, so that the interferometer operates with a maximal sensitivity, has then a non-zero drag error. This drag error is due to the non-zero reaction time of the loop between the input and the output thereof. The loop output causes an error equal to the acceleration multiplied by the time lag. Now, in a first order system, the lag time is the characteristic time of the loop, equal to the inverse of the gain coefficient K. Thus, an angular acceleration has for effect to create an additional phase shift by time unit of $$A = \frac{d\Omega}{dt} \times \frac{\pi}{\Omega_\pi}$$

and an angular drag error of $$\Omega_{erreur} = \frac{d\Omega}{dt} \times t_c,$$

thus a phase shift equal to:

$$s_2 = \Omega_{erreur} \times \frac{\pi}{\Omega_\pi} = A \times t_c = \frac{A}{K}$$

Thus, a drag error has been simulated to generate a bias inversely proportional to the gain of the system.

Finally, to dissociate the false drag error from a real rotation, it is possible, for example, to alternate positive and negative values for constant A.

Figure 5:
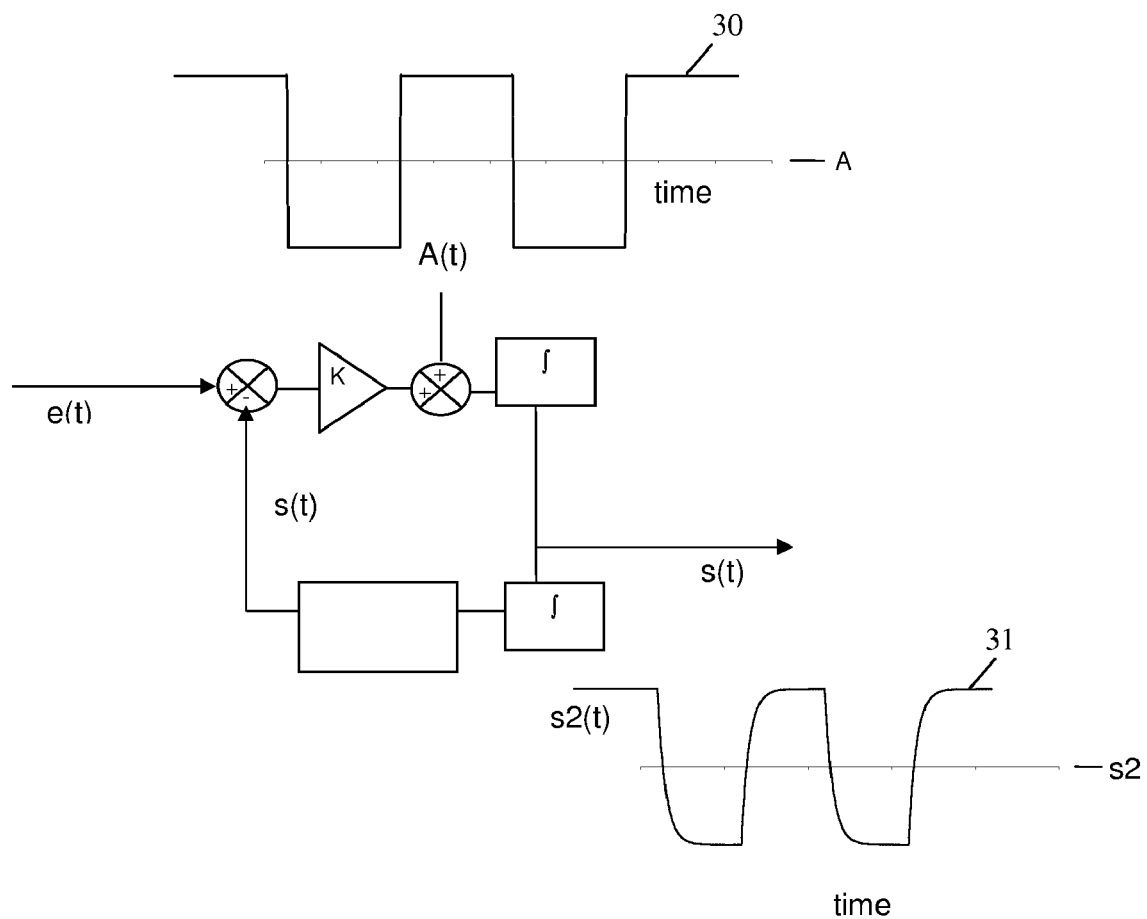
FIG. 5 is a schematic representation of a Sagnac loop in which the difference between the input signal e(t) and the output signal s(t) is servo-controlled to zero, a fixed phase shift being inserted immediately before the regulator according the embodiment of the invention.

FIG. 5 describes such a device, which allows to measure a value inversely proportional to K. Square-waveform signal 30 represents the fictive angular acceleration A(t), added by feedback, in function of time. Signal 31 represents the phase shift $S_2(t)$ in function of time. The fictive angular acceleration A(t) produces an effect on $S_2(t)$ which adds to the measure.

The mean difference between the high and low levels of the square-waveform, which adds to the output, is equal to 2A/K. Now, the fluctuations of K are only due to variations of the analog gains, and mainly to the variations of the detection optical power $P_0$.

So as not to mix up the response of the optical-fibre measuring device at the time of introducing a disturbance with the first signal $S_1$ function of the measured parameter, the frequency fo of the disturbance can also be adjusted for example so as to be aperiodic or greater than the frequency of the measured parameter signal. Any signal waveform can be used: pseudo-random ramp, semi-parabolic, sinusoidal, triangular waveforms or others.

This processing can be used to servo control light source 3. This processing is also a measure of the Sagnac loop closed-loop gain and can be used as a self-test of an optical-fibre gyroscope.

A theoretical approach has been developed to explain the obtained results.

Figure 4:
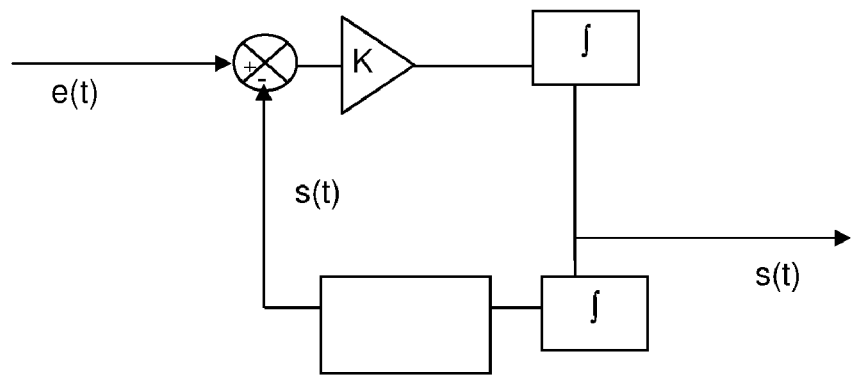
FIG. 4 is a schematic representation of a Sagnac loop of the prior art in which the difference between the input signal e(t) and the output signal s(t), that is the phase error ($\delta\phi_p + \delta\phi_{cr}$), is servo-controlled to zero.

Considering the Sagnac loop design according to FIG. 4, where a regulator 21 is in fact a simple integrator with an integral coefficient $K_i$, Sagnac loop is a first-order servo-control loop, which means that the feedback phase shift denoted $\delta\phi_{cr}$ is governed by the following differential equation:

$$\delta\phi_{cr} = -K \times \int (\delta\phi_p + \delta\phi_{cr}) dt$$

where:

t is the time, $\delta\phi_p$ is the phase shift due to the rotation by Sagnac effect and serves as an input function of the system: $e(t)=\delta\phi_p$, K is the integral gain coefficient of this first order system, $\delta\phi_{cr}$ is the feedback phase shift which offsets $\delta\phi_p$ and serves, but for the sign, as an output function of the system $s(t)=-\delta\phi_{cr}$.

It can also be established that this system is of the first order due to the presence of two integrators (regulator 21 and integrator 22) and of a differentiator (optical modulator 15) in the Sagnac loop feedback.

The diagram of Sagnac loop is reminded in FIG. 4. In this loop, the phase error $(\delta\phi_p + \delta\phi_{cr}) = e(t) - s(t)$ is servo-controlled to zero.

In this embodiment of the invention, it is sought to shift the feedback by a constant A homogeneous to a phase shift. This constant is numerically added and, supposing that the value of $V_\pi$ is well servo-controlled, constant A corresponds to a fixed phase shift at the interferometer, notably independent of the optical power $P_0$ and of the gain analog contributions liable to vary.

We have then:

$$\delta\varphi_{cr} = -\left(K \times \int (\delta\phi_p + \delta\phi_{cr})dt + \int A dt\right)$$

$$s(t) = \int [K(e(t) - s(t)) + A] dt$$

$$\frac{ds}{dt}(t) = K(e(t) - s(t)) + A$$

Denoting S(p) and E(p) the respective Laplace transforms of signals s(t) and e(t) gives:

$$pS(p) = K \times (E(p) - S(p)) + \frac{A}{p}$$

$$S(p) \times (p + K) = K \times E(p) + \frac{A}{p}$$

$$S(p) = \frac{K}{p+K} E(p) + \frac{A}{p(p+K)}$$

$$S(p) = \frac{1}{1+\frac{p}{K}} E(p) + \frac{A}{K} \times \frac{K}{p \times (p+K)}$$

Applying the inverse Laplace transform gives the output signal $$s(t) = s_1(t) + s_2(t)$$

$s_1(t)$ is the inverse Laplace transform of $$\frac{1}{1+p/K} E(p)$$

and corresponds to the normal response of a first order system according to FIG. 4.

$s_2(t)$ is the inverse Laplace transform of $$\frac{A}{K} \times \frac{K}{p(p+K)}$$

and corresponds to the effect of introduction of shift A.

From inverse Laplace transform tables, we find:

$$s_2(t) = \frac{A}{K} \times (1 - e^{-Kt})$$

$$s_2(t) = \frac{A}{K} \quad \text{pour } t \gg t_c = \frac{1}{K}$$

It is deduced that shifting the servo control by constant A results, after a characteristic time exponential rising equal to that of the loop, in creating on the output a bias with a value inversely proportional to the first order gain coefficient of Sagnac loop.

In another embodiment of the invention, it is sought to create new modulation states which allow to measure, after a specific demodulation, the power level received on the main detector.

Let's first remind that the "four-state" modulation described in French patent FR-A-2 654 827 consists of a biasing modulation with four phase shift values:

$\delta\phi_{b1} = \alpha_0$ $\delta\phi_{b2} = 2\pi - \alpha_0$ $\delta\phi_{b3} = -\alpha_0$ $\delta\phi_{b4} = -(2\pi - \alpha_0)$ where $\alpha_0$ is a constant phase shift. The biasing phase shift adds to the phase difference $\delta\phi_p$ produced by the measured parameter and to the feedback phase shift $\delta\phi_{cr}$. The power values measured on detector 13 receiving the light flux from the interferometer have thus respectively for the states i=1 to 4:

$$P_i = P_0 \times \left(\frac{1 + \cos(\delta\phi_{bi} + \delta\phi_p + \delta\phi_{cr})}{2}\right)$$

$$= P_0 \times \cos^2\left(\frac{\delta\phi_{bi} + \delta\phi_p + \delta\phi_{cr}}{2}\right)$$

During the operation of an optical-fibre measuring device, the signal $(\delta\phi_p + \delta\phi_{cr})$ is servo-controlled to zero, which enables the interferometer to be operated with the maximal sensitivity. The signal $(\delta\phi_p + \delta\phi_{cr})$ is thus very small relative to 1 and the linear approximation of $\cos^2$ function around the value $\cos^2(\delta\phi_{bi}/2)$ can be done. Thus:

$$P_i \approx P_0 \times \cos^2\left(\frac{\delta\phi_{bi}}{2}\right) - P_0 \times (\delta\phi_p + \delta\phi_{cr}) \times 2\sin\left(\frac{\delta\phi_{bi}}{2}\right) \times \cos\left(\frac{\delta\phi_{bi}}{2}\right) \times \frac{1}{2}$$

$$P_i \approx P_0 \times \cos^2\left(\frac{\delta\phi_{bi}}{2}\right) - \frac{P_0}{2} \times (\delta\phi_p + \delta\phi_{cr}) \times \sin(\delta\phi_{bi})$$

Most often, the synchronous detection is followed by a high-pass filter which eliminates the continuous component before a sampling by analog-digital converter 18 (FIG. 14).

It is interesting to note that, according to trigonometric laws:

$$\cos^2(\alpha_0/2) = \cos^2((2\pi - \alpha_0)/2) = \cos^2(-\alpha_0/2) = \cos^2(-(2\pi - \alpha_0)/2).$$

It is deduced therefrom that, when the optical-fibre measuring device, and thus Sagnac loop, is servo-controlled, the continuous component is:

$$\langle P_i \rangle = P_0 \times \cos^2\left(\frac{\alpha_0}{2}\right).$$

Figure 6:
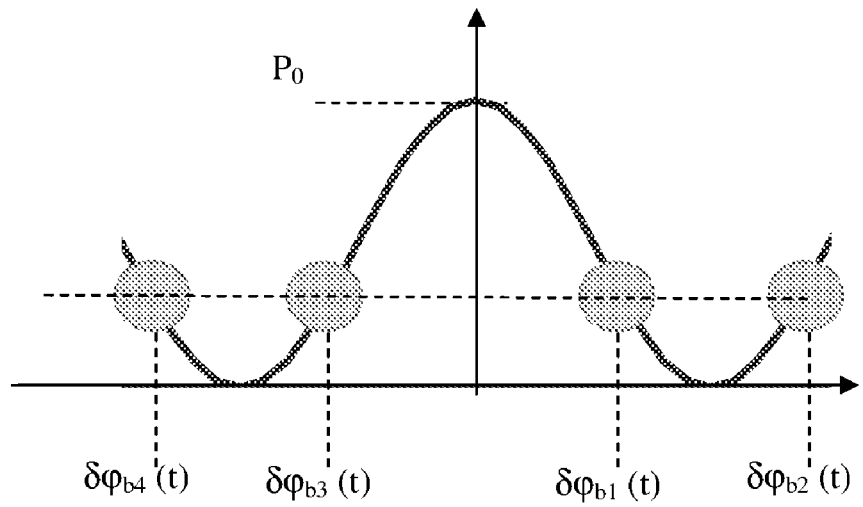
FIG. 6 shows the power level detected at output of the interferometer in function of the interference state thereof in case of a so-called "four-state" modulation of the prior art.

The four modulation states have the same power level, as shown in FIG. 6, which represents the power level detected at the output of the interferometer in function of the interference state thereof.

In FIG. 6, ordinate axis represents the signal measured by detector 13 and abscissa axis represents the phase shift value.

The error signal used in Sagnac loop is calculated by:

$$\epsilon_{sagnac} = P_1 - P_2 - P_3 + P_4$$

The error signal used in the loop servo-controlling the value $V_\pi = \pi \cdot V_m/\phi_m$ is calculated by:

$$\epsilon_{V\pi} = P_1 - P_2 + P_3 - P_4$$

According to this embodiment of the invention, two new modulation states are added, having a mean power slightly different from $P_0 \times \cos^2(\alpha_0/2)$.

Figure 7:
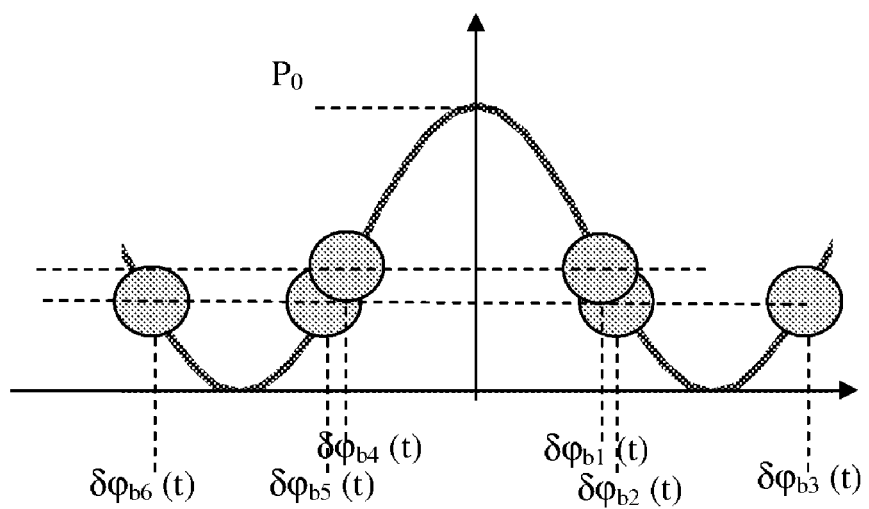
FIG. 7 shows the power level detected at output of the interferometer in function of the interference state thereof in case of a so-called "six-state" modulation according to an embodiment of the invention.

It can be carried out, for example, a six-state modulation with:

$$\delta\phi_{b1} = \alpha_0 - \epsilon_0$$

$$\delta\phi_{b2} = \alpha_0$$

$$\delta\phi_{b3} = 2\pi - \alpha_0$$

$$\delta\phi_{b4} = -(\alpha_0 - \epsilon_0)$$

$$\delta\phi_{b5} = -\alpha_0$$

$$\delta\phi_{b6} = -(2\pi - \alpha_0)$$

where $\epsilon_0$ is low enough to stay in the measuring range of analog-digital converter 18. The power mean levels of the different states are now slightly different as shown in FIG. 7, and the difference thereof is proportional to power $P_0$.

With the modulation pattern, the error signal used in Sagnac loop is calculated by:

$$\epsilon_{sagnac} = P_2 - P_3 - P_5 + P_6$$

The error signal used in the loop servo-controlling the value $V_\pi = \pi \cdot V_m/\phi_m$ is calculated by:

$$\epsilon_{V\pi} = P_2 - P_3 + P_5 - P_6$$

The signal serving to measure $P_0$ is calculated by:

$$\text{value}_{P_0} = P_1 - P_2 + P_4 - P_5$$

$$\langle \text{value}_{P_0} \rangle = P_0 \cdot \cos^2\left(\frac{\alpha_0 - \varepsilon_0}{2}\right) -$$
$$P_0 \cdot \cos^2\left(\frac{\alpha_0}{2}\right) + P_0 \cdot \cos^2\left(-\frac{\alpha_0 - \varepsilon_0}{2}\right) - P_0 \cdot \cos^2\left(-\frac{\alpha_0}{2}\right)$$

$$\langle \text{value}_{P_0} \rangle \approx P_0 \cdot \varepsilon_0 \cdot \sin(\alpha_0)$$

$P_0$ can possibly be servo-controlled to a constant through using of following error signal:

$$\epsilon_{p0} = \text{Control} - (P_1 - P_2 + P_4 - P_5)$$

It is then enough to use this error signal to set the power of the light source. A loopback can thus be made on the source as shown in FIG. 5 and FIG. 3 where loopback digital electronic block 19 is supposed to be augmented by the proposed digital processing and has thus a power control signal as additional output to source 3.

Figure 8:
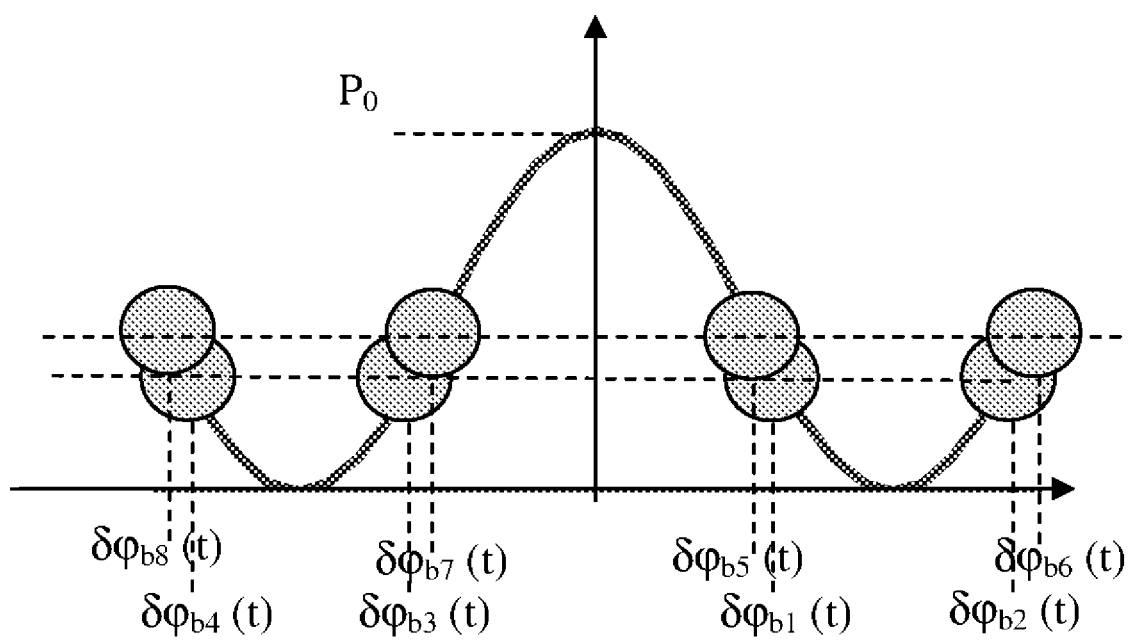
FIG. 8 shows the power level detected at output of the interferometer in function of the interference state thereof in case of a so-called "height-state" modulation according to an embodiment of the invention.

It can also be carried out a height-state modulation with:

$$\delta\phi_{b1} = \alpha_0$$

$$\delta\phi_{b2} = 2\pi - \alpha_0$$

$$\delta\phi_{b3} = -\alpha_0$$

$$\delta\phi_{b4} = -(2\pi - \alpha_0)$$

$$\delta\phi_{b6} = 2\pi - \alpha_0 + \epsilon_0$$

$$\delta\phi_{b8} = -(2\pi - \alpha_0) - \epsilon_0$$

where $\epsilon_0$ is low enough to stay in the measuring range of analog-digital converter 18. The power mean levels of the different states are also slightly different as shown in FIG. 8, and the difference thereof is proportional to $P_0$.

With the modulation pattern, the error signal used in Sagnac loop is calculated by:

$$\epsilon_{sagnac} = P_1 - P_2 + P_4 - P_3 + P_5 - P_6 + P_8 - P_7$$

The error signal used in the loop servo-controlling the value $V_\pi = \pi \cdot V_m/\phi_m$ is calculated by:

$$\epsilon_{V\pi} = P_1 - P_2 + P_3 - P_4 + P_5 - P_6 + P_7 - P_8$$

Modulations with a number of states greater than 8 are also possible.

The invention claimed is:

1. Optical-fibre measuring device in which the variation of a measured parameter generates a phase difference between two waves, including:
    a wide-spectrum light source with a light power P,
    a Sagnac ring interferometer, preferably single-mode, in which propagate two counter-propagating waves, the wave propagation time between the separation and recombination thereof being $\tau$,
    a detector receiving a light flux from the interferometer and converting it into an electrical signal representing the total phase difference $\delta\phi_t$ between the counter-propagating waves,
    an optical phase modulator generating a phase difference $\delta\phi_m = \delta\phi_b + \delta\phi_{cr}$, including a biasing component $\delta\phi_b$ and a feedback component $\delta\phi_{cr}$,
    electronic means receiving the electrical signal from the detector and providing a first signal $S_1$ function of the measured parameter,
    said first signal function of the measured parameter producing an optical phase modulator first control signal $V_{cr}$, determined so that the phase difference $\delta\phi_{cr}$ produced thereby between the counter-propagating waves offsets the phase difference $\delta\phi_p$ introduced by the measured parameter,
    said electronic means including a demodulator contributing to provide the first signal function of the measured parameter,
    said electronic means providing a second signal $S_2$ function of the light power P of the light source,
    characterized in that the optical phase modulator generates a disturbance component $\delta\phi_{cp}$ adding to the phase difference $\delta\phi_m = \delta\phi_b + \delta\phi_{cr}$.

2. The optical-fibre measuring device according to claim 1, characterized in that the biasing component $\delta\phi_b$ is generated by an optical phase modulator second control signal $V_b$, determined so that the phase difference $\delta\phi_b$ produced thereby between the counter-propagating waves takes at least six states ($\delta\phi_1, \delta\phi_2, \ldots$) defined by $\alpha_0$ and $\epsilon_0$, with $0 \leq \epsilon_0 < \alpha_0 \leq \pi$ and such that:

$$\delta\phi_1 = \alpha_0 - \epsilon_0 \quad \delta\phi_4 = -(\alpha_0 - \epsilon_0)$$

$$\delta\phi_2 = \alpha_0 \quad \delta\phi_5 = -\alpha_0$$

$$\delta\phi_3 = 2\pi - \alpha_0 \quad \delta\phi_6 = -(2\pi - \alpha_0)$$

and in that the electronic means produce a second signal $S_2$ function of the power P of the light flux measured by the detector using the six values $x_1, x_2, x_3, x_4, x_5$ et $x_6$ provided in response to a period of the control signal according to the formula $(x_1 + x_4) - (x_2 + x_5)$.

3. Gyrometer characterized in that it complies with the measuring device according to claim 1, the measured parameter being the rotation speed of the interferometer.

4. The optical-fibre measuring device according to claim 1, characterized in that the electronic means include a closed-loop feedback circuit comprising electronic means for servo-controlling the light power P of the light source.

5. The optical-fibre measuring device according to claim 4, characterized in that it comprises an amplifier to amplify the electrical signal produced by the detector and an analog-digital converter digitizing the amplified electrical signal, said amplifier and converter being placed between said detector and said electronic means.

6. The optical-fibre measuring device according to claim 4, characterized in that the electronic means comprise a biasing modulator producing an optical phase modulator second control signal $V_b$ to generate said biasing component $\delta\phi_b$.

7. The optical-fibre measuring device according to claim 4, characterized in that the electronic means comprise:
- a regulator placed after said demodulator, the regulator being a first integrator,
- a second integrator placed after said first integrator,
- a disturbance source introducing a frequency disturbance $f_{cp}$ generating an optical phase modulator third control signal $V_{cp}$, said third control signal $V_{cp}$ producing a phase difference $\delta\phi_{cp}$ between the counter-propagating waves and adding to the first control signal $V_{cr}$,
- said disturbance being injected through a disturbance injection circuit immediately before or after the regulator.

8. The optical-fibre measuring device according to claim 1, characterized in that it comprises an amplifier to amplify the electrical signal produced by the detector and an analog-digital converter digitizing the amplified electrical signal, said amplifier and converter being placed between said detector and said electronic means.

9. The optical-fibre measuring device according to claim 8, characterized in that the electronic means comprise a biasing modulator producing an optical phase modulator second control signal $V_b$ to generate said biasing component $\delta\phi_b$.

10. The optical-fibre measuring device according to claim 8, characterized in that the electronic means comprise:
- a regulator placed after said demodulator, the regulator being a first integrator,
- a second integrator placed after said first integrator,
- a disturbance source introducing a frequency disturbance $f_{cp}$ generating an optical phase modulator third control signal $V_{cp}$, said third control signal $V_{cp}$ producing a phase difference $\delta\phi_{cp}$ between the counter-propagating waves and adding to the first control signal $V_{cr}$,
- said disturbance being injected through a disturbance injection circuit immediately before or after the regulator.

11. The optical-fibre measuring device according to claim 1, characterized in that the electronic means comprise a biasing modulator producing an optical phase modulator second control signal $V_b$ to generate said biasing component $\delta\phi_b$.

12. The optical-fibre measuring device according to claim 11, characterized in that:
- the electronic means comprise an adder comprising two inputs and one output,
- the first input of the adder receiving said optical phase modulator first control signal $V_{cr}$ and the other input thereof receiving said optical phase modulator second control signal $V_b$,
- and said device comprising a digital-analog converter receiving the output signal of the adder and controlling the optical phase modulator.

13. The optical-fibre measuring device according to claim 11, characterized in that the electronic means comprise:
- a regulator placed after said demodulator, the regulator being a first integrator,
- a second integrator placed after said first integrator,
- a disturbance source introducing a frequency disturbance $f_{cp}$ generating an optical phase modulator third control signal $V_{cp}$, said third control signal $V_{cp}$ producing a phase difference $\delta\phi_{cp}$ between the counter-propagating waves and adding to the first control signal $V_{cr}$,
- said disturbance being injected through a disturbance injection circuit immediately before or after the regulator.

14. The optical-fibre measuring device according to claim 12, characterized in that the electronic means comprise:
- a regulator placed after said demodulator, the regulator being a first integrator,
- a second integrator placed after said first integrator,
- a disturbance source introducing a frequency disturbance $f_{cp}$ generating an optical phase modulator third control signal $V_{cp}$, said third control signal $V_{cp}$ producing a phase difference $\delta\phi_{cp}$ between the counter-propagating waves and adding to the first control signal $V_{cr}$,
- said disturbance being injected through a disturbance injection circuit immediately before or after the regulator.

15. The optical-fibre measuring device according to claim 1, characterized in that the electronic means comprise:
- a regulator placed after said demodulator, the regulator being a first integrator,
- a second integrator placed after said first integrator,
- a disturbance source introducing a frequency disturbance $f_{cp}$ generating an optical phase modulator third control signal $V_{cp}$, said third control signal $V_{cp}$ producing a phase difference $\delta\phi_{cp}$ between the counter-propagating waves and adding to the first control signal $V_{cr}$,
- said disturbance being injected through a disturbance injection circuit immediately before or after the regulator.

16. The optical-fibre measuring device according to claim 15, characterized in that the disturbance has a zero-mean value.

17. The optical-fibre measuring device according to claim 15, characterized in that the disturbance is aperiodic.

18. The optical-fibre measuring device according to claim 15, characterized in that the frequency $f_{cp}$ of the disturbance is greater than the frequency of the measured parameter signal.

19. The optical-fibre measuring device according to claim 15, characterized in that the disturbance signal includes pseudo-random ramps.

20. Method for measuring a parameter whose variation generates a phase difference between two waves, in which:

two counter-propagating waves emitted by a wide-spectrum light source with a light power P are propagated in a preferably single-mode Sagnac ring interferometer, the wave propagation time between the separation and recombination thereof being $\tau$, the light flux outputted from the interferometer is detected and converted into an electrical signal representing the total phase difference $\delta\phi_t$ between the counter-propagating waves, a phase difference $\delta\phi_m = \delta\phi_b + \delta\phi_{cr}$ between the counter-propagating waves is generated, said phase difference $\delta\phi_m$ including a biasing component $\delta\phi_b$ and a feedback component $\delta\phi_{cr}$, an electrical signal outputted from the detector is sent to electronic means and said electronic means determine a first signal $S_1$ function of the measured parameter, said first signal function of the measured parameter producing an optical phase modulator first control signal $V_{cr}$, determined so that the phase difference $\delta\phi_{cr}$ produced thereby between the counter-propagating waves offsets the phase difference $\delta\phi_p$ introduced by the measured parameter, said electronic means determine a second signal $S_2$ function of the light power P of the light source from the electrical signal outputted from the detector, characterized in that the optical phase modulator generates a disturbance component $\delta\phi_{cp}$ adding to the phase difference $\delta\phi_m = \delta\phi_b + \delta\phi_{cr}$.

* * * * *